United States Patent
La

(10) Patent No.: US 6,963,952 B1
(45) Date of Patent: Nov. 8, 2005

(54) MULTI-SESSION OPTICAL MEDIA AND METHODS FOR RECORDING

(75) Inventor: Luke Kien La, Los Angeles, CA (US)

(73) Assignee: Sonic Solutions, Inc., Novato, CA (US)

( * ) Notice: Subject to any disclaimer, the term of this patent is extended or adjusted under 35 U.S.C. 154(b) by 451 days.

(21) Appl. No.: 10/199,164

(22) Filed: Jul. 19, 2002

(51) Int. Cl.$^7$ .......................... G11B 7/004; G06F 12/06
(52) U.S. Cl. ...................... 711/112; 369/30.03; 711/4; 711/171
(58) Field of Search .......................... 711/4, 111, 112, 711/170, 172, 173, 202; 369/30.01, 30.03, 369/32.01

(56) References Cited

U.S. PATENT DOCUMENTS 6,631,107 B1 * 10/2003 Ito et al. ................... 369/53.2
2003/0026598 A1 * 2/2003 Karitani ..................... 386/125
2003/0081535 A1 * 5/2003 Ross ........................ 369/275.3

\* cited by examiner

*Primary Examiner*—Gary Portka
(74) *Attorney, Agent, or Firm*—Martine Penilla & Gencarella, LLP

(57) ABSTRACT

A software driven method for recording data to optical media is provided. Embodiments include a software-driven method for writing multi-session optical media that is compliant with UDF Revision 1.02 standards and specifications. An optical media with one or more sessions recorded to the media space is received for recording a subsequent session. The start of the first partition space in a first session is located and a sector is determined for the start of the subsequent session. Data is prepared for recording to the subsequent session, and the partition space of the subsequent session is defined to start at the sector of the start of the first partition space in the first session on the optical media. File identification and file entry structures are imported into the subsequent session, and the subsequent session is written in compliance with UDF Revision 1.02, and providing access to all user data recorded to the multi-session optical media space.

18 Claims, 5 Drawing Sheets

MULTI-SESSION OPTICAL MEDIA AND METHODS FOR RECORDING

BACKGROUND OF THE INVENTION

1. Field of the Invention

The present invention relates generally to the recording of data to optical media, and more specifically to a method for enabling multi-session capability in Universal Disk Format™ (UDF) Revision 1.02 environments.

2. Description of the Related Art

As optical media recording technology continues to make substantial advancements, the casual consumer computer user is able to record all kinds, types, and formats of digital data to compact disc (CD), digital video disc (DVD), and the various kinds, types, and formats of optical media. As is well known, there are several types of optical media and associated optical media standards to define structure and format and to ensure compatibility across disparate operating systems, components, and devices. For example, ISO-9660, Joliet, UDF, and other standards for media format all have specific applications relevant to optical media.

The structure and format of data recorded to optical media is generally defined and described in the family of UDF specifications. The Optical Storage Technology Association (OSTA) has developed and implemented the UDF to enable file interchange among different operating systems and environments. In general, UDF was developed to implement ISO/IEC 13346 (also known as ECMA 167). Whereas ISO/IEC 13346 is a broad, general standard for storing information on any media, the UDF specifically provides a standard for recording data to a plurality of recordable and rewritable optical media including CD-ROM CD-Recordable (CD-R) and CD-Rewritable (CD-RW) as well as DVD-ROM, DVD-R, DVD-RW, DVD+R, DVD+RW, double density media, multi-layered media, and others. Although terms such as "operating system," and the process of recording data suggest a computer system environment, it should be appreciated that UDF is applicable to and defines the format for consumer CD audio devices for home and mobile audio systems, consumer DVD devices for both home and mobile DVD audio/visual systems, in addition to the many and varied computer system environments.

The UDF specification includes a number of revisions, some of which were developed and released to capture and implement standards for emerging and developing optical media technologies. By way of example, UDF Revision 1.02 includes standards and formats for DVD devices, UDF Revision 1.50 includes standards and formats for defect management and packet writing, UDF Revision 2.0 includes standards and formats intended to supercede Revision 1.50, and adds standards and formats for streaming and improved security control for optical media, and UDF Revision 2.01 includes standards and formats to update Revision 2.0, and adds standards and formats for real time files. It should be anticipated that, as additional technologies and advancements in optical media are developed and released, the UDF will continue to evolve, and additional revisions will be released.

Multi-session and multi-border recording to optical media is an example of one advancement in optical media technology that was captured in the UDF during the periodic revision cycle. Prior to UDF Revision 1.50, no multi-session or multi-border standards or formats were implemented in the UDF. Beginning with UDF Revision 1.50, multi-session and multi-border recording is implemented in UDF. UDF Revision 1.02, however, does not include implementation of multi-session or multi-border recording, and therefore DVD devices compliant with UDF Revision 1.02 do not support multi-session or multi-border optical media. Consumer DVD devices such as, by way of example, DVD players used with television sets or audio/visual systems are generally UDF Revision 1.02 compliant, and therefore do not support or recognize multi-session or multi-border optical media. Generally, if a multi-session or multi-border DVD is inserted into a UDF Revision 1.02 compliant consumer DVD player, the consumer DVD player will only "see" one session. Typically, only the first session of the multi-session DVD is seen by the consumer DVD player, and therefore only the content of the first session is accessible for viewing.

Generally, consumer computer DVD drives are also UDF Revision 1.02 compliant, and therefore do not support multi-session, multi-border recording As it becomes more and more common for consumers to view and burn DVD media on computers, the compliance of the consumer computer DVD recording device is a relevant consideration. Depending on the operating system found on the consumer computer, the operating system will generally see only the final session of a multi-session media. In a Macintosh™ or a Windows™ NT™ 4.0 and Windows™ 9X™ environment, as of the time of this paper, only the first session is recognized.

In light of the foregoing, what is needed is a method and system of recording DVD optical media that is in accordance with the UDF Revision 1.02, but that can be recorded in multi-session or multi-border, and each session of such recorded media is visible and viewable on UDF Revision 1.02 compliant DVD devices.

SUMMARY OF THE INVENTION

Broadly speaking, the present invention fills these needs by providing methods to record multi-session optical media that adheres to the standards and specifications dictated in UDF Revision 1.02. The present invention can be implemented in numerous ways, including as a process, an apparatus, a system, a device, a method, or a computer readable media. Several embodiments of the present invention are described below.

In one embodiment, a software driven method for recording data to optical media is disclosed. The software driven method includes receiving an optical media for recording and determining if a previous session of data is recorded to the received optical media. If a previous session is recorded to the optical media, the method provides for calculating a media space required for recording a subsequent session to the received optical media. A sector at which a start of a first partition is defined in a first session on the received optical media is located, and a first sector for the subsequent session to be recorded to the optical media is located as well. The method then defines a partition space of the subsequent session to be recorded to the received optical media to begin at the sector at which the start of the first partition is defined in the first session on the received optical media. The method then provides for writing the subsequent session to the optical media with the defined partition space from the sector at which the start of the first partition is defined in the first session through the final sector of the subsequent session.

In another embodiment, a method for writing a multi-session optical media is disclosed. The method includes receiving an optical media to which user data is to be written. The optical media has at least one session of data recorded thereto, and the method determines a total size of media space required to write selected user data to a next session on the optical media. The method further includes determining a sector at which the selected user data will start in the next session, and calculating a number of sectors between the sector at which the selected user data will start in the next session and a sector at which user data begins in a first session on the optical media. The method then provides for writing the selected user data to the next session on the optical media. The selected user data is addressed on the optical media in reference to the sector at which user data begins in the first session on the optical media.

In still a further embodiment, computer readable media having program instructions for recording data to optical media is disclosed. The computer readable media includes program instructions for accessing a previous session of data recorded to the optical media, and program instructions for calculating a media space required for recording a next session to the optical media. The computer readable media further includes program instructions for locating a sector at which a start of a first partition is defined in a first session on the optical media, and for determining a physical address for a first sector for the next session to be recorded to the optical media. Additional program instructions are provided for defining a partition space of the next session to be addressed from a point of reference defined at the sector at which the start of the first partition is defined in the first session on the optical media. The computer readable media further provides program instructions for writing the next session to the optical media.

In yet another embodiment, a multi-session optical media having data recorded thereon is disclosed. The multi-session optical media is recorded in compliance with UDF 1.02, and formatted so that the data in each session of the multi-session optical media is accessible by a UDF 1.02 compliant optical media device.

The advantages of the present invention are numerous. One notable benefit and advantage of the invention is the ability to write multiple sessions of data to an optical media that can be accessed, viewed, executed, and otherwise utilized in a UDF Revision 1.02 environment. This is of particular use in consumer DVD players, and in the developing enterprise of consumer-generated DVD optical media.

Other advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements.

DETAILED DESCRIPTION OF THE PREFERRED EMBODIMENTS

An invention for the creation of multi-session, multi-border optical media that is in accordance with and does not violate the UDF Revision 1.02 specification is disclosed. In preferred embodiments, methods and systems for recording multi-session optical media include a software driven method for recording data to optical media that defines a partition space of a subsequent session to be recorded to optical media to begin at the sector at which the start of the first partition is defined in the first session on the optical media, and the defined partition space for the subsequent session then extends from the sector at which the start of the first partition is defined in the first session through the final sector of the subsequent session.

In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Figure 1A:
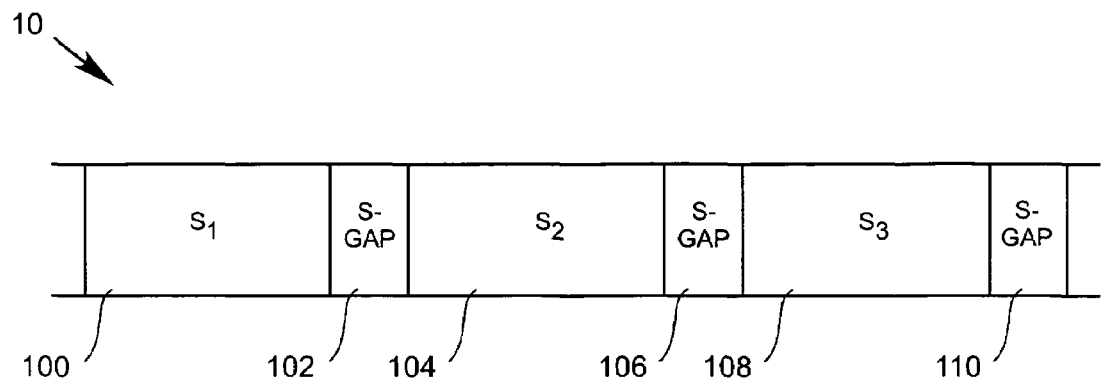
FIG. 1A shows a block diagram of data illustrating the general organization of data as recorded in multi-session or multi-border to optical media.

FIG. 1A shows a block diagram 10 of data illustrating the general organization of data as recorded in multi-session or multi-border to optical media. It is noted that the terms "track" and "session," as they apply to CD optical media and as used herein, also are equivalent to the concepts of "zone" and "border" as they apply to DVD optical media. As represented in data diagram 10, each session $S_1$ 100, $S_2$ 104, and $S_3$ 108, is a complete and contiguous unit of data. Each session $S_1$ 100, $S_2$ 104, and $S_3$ 108, is separated by a session gap 102, 106, 110, The size of the session, the size of the session gap, and the number of sessions recorded to the optical media is variable.

Figure 1B:
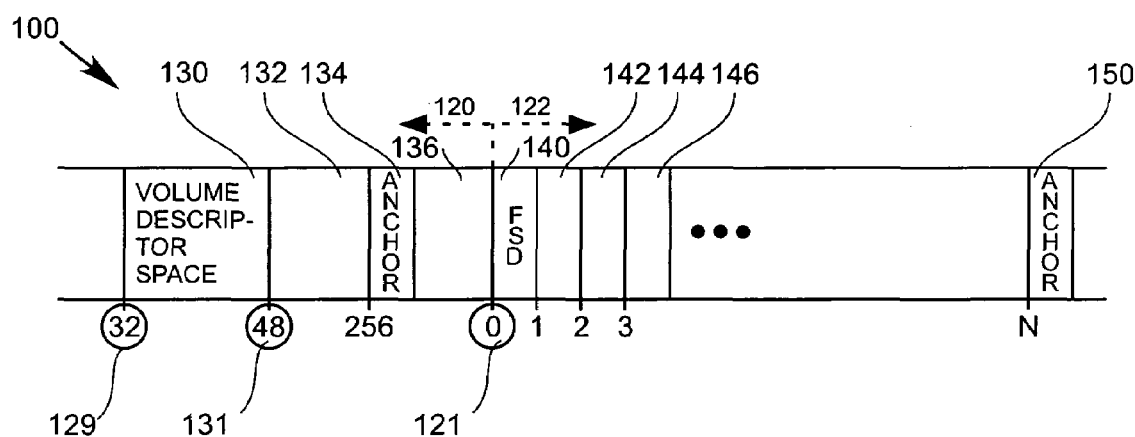
FIG. 1B illustrates a single session of data as described in FIG. 1A.

FIG. 1B illustrates a single session $S_1$ 100 of data as described in FIG. 1A. Data recorded in a session 100 as illustrated in FIG. 1B illustrate the general structure and format of data recorded in accordance with the UDF Revision 1.02. A general description of selected structures and organization is provided in the following discussion. For a more detailed and thorough description of the entire data structure and format, reference is drawn to UDF Revision 1.02, which is incorporated herein by reference.

Data is generally organized into one of two areas of a session 100. The volume space 120 includes the file system and data structures to enable playing or viewing of the media in computer systems. As is known, such structures are defined by the ISO 9660 specification, and when implemented in DVD and other specific optical media, known as the ISO 9660 bridge. The partition space 122, in general, contains the UDF file system and structures, and the user data.

The ISO 9660 bridge contained in the volume space 122 includes, among other structures, the volume descriptor space 130 (VDS) which is also known as the volume descriptor sequence, additional structures 132, an anchor 134 which is also known as the anchor volume descriptor pointer, and additional ISO 9660 structures 136. The ISO 9660 structures, and the ISO 9660 bridge, are generally known in the art. Specific structures are identified for further discussion below.

Figure 1C:
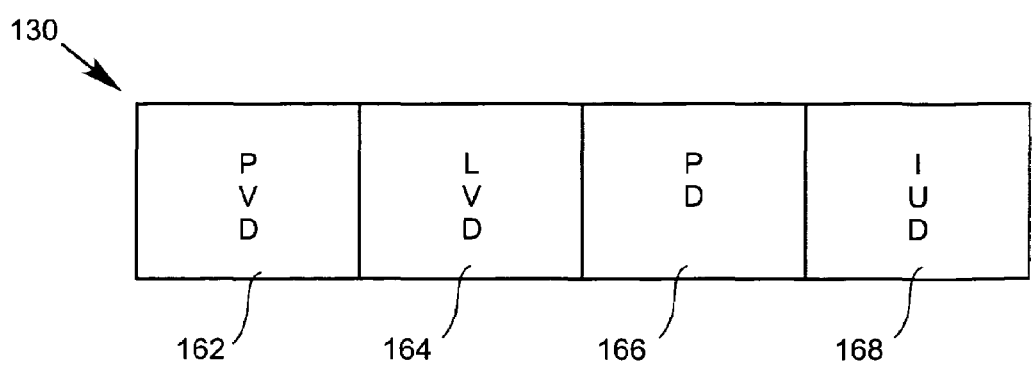
FIG. 1C is a block diagram illustrating four structures of the VDS.

FIG. 1C is a block diagram illustrating four structures of the VDS 130. The illustrated components, which can be in any order, include the primary volume descriptor (PVD) 162, the logical volume descriptor (LVD) 164, the partition descriptor (PD) 166, and the implementation use volume descriptor (IUVD) 168. As is generally known, the PVD 162, the LVD 164, the PD 166, and the IUVD 168, are the ISO 9660 structures that essentially define the media space to which data is written. In general, the media space defined by the ISO 9660 structures is a single session as shown in FIG. 1A as $S_1$ 100, $S_2$ 104, and $S_3$ 108, but there is no requirement that only the session, or a single session, be so defined.

Returning to FIG. 1C, the LVD 164, as is known, generally identifies the logical block in which the file set descriptor (FSD) is written, or begins, and identifies the size or length of the FSD. Typically, the FSD begins the first block of the partition space, but this is not a specification requirement. The PD 166 identifies the location of the partition, and the partition size or length. Theoretically, the partition can start anywhere on the optical media as designated and identified in the PD 166. In general, the identification of location and size is by and with logical sectors or logical blocks.

Looking again to FIG. 1B, it can be seen that in some UDF 1.02 implementations, the VDS 130 is located in the volume space 120 of the session 100. In the illustrated implementation, the volume space 120 includes everything to the left of block 0, identified as 121. Everything to the right of block 0, 121, is the partition space 122. The FSD 140 is shown in block 0, the first block in the partition space 122. As described above, this illustrates a typical implementation in which the FSD begins the first block of the partition space 122. In the illustrated implementation, the LVD 164 (see FIG. 1C) points to block 0, 121, and provides the size of the FSD 140. The PD 166 also points to block 0, 121, as the location of the start or beginning of the partition, and identifies the space from block 0, 121, to the end of the session (not shown) as the partition size.

FIG. 1B illustrates an additional feature of a typical UDF implementation. In general, the volume space is identified by logical block number, or logical sector number, relative to the start of the session. By way of example, the typical volume space includes reserved blocks 1–16, ISO 9660 bridge structures in blocks 16–20, and the VDS 130 in blocks 32 (129) through 48 (131). Although a number of structures are defined by the UDF as required to be present, the specific order, frequency of occurrence, size, and the like are not necessarily mandated by the specification. Table 1 illustrates one embodiment of the order and content of a volume space in accordance with the present invention:

TABLE 1

| LSN | Descriptors | Structure |
| --- | --- | --- |
| 0 to 15 | Reserved | |
| 16 | Primary Volume Descriptor (ISO 9660) | UDF Bridge Volume Recognition Sequence |
| 17 | Volume Descriptor Set Terminator | |
| 18 | Beginning Extended Area Descriptor | |
| 19 | NSR Descriptor | |
| 20 | Terminating Extended Area Descriptor | |

TABLE 1-continued

| LSN | Descriptors | Structure |
| --- | --- | --- |
| 21 to 31 | Reserved | |
| 32 | Primary Volume Descriptor (UDF) | Main Volume Descriptor Sequence |
| 33 | Implementation Use Volume Descriptor | |
| 34 | Partition Descriptor | |
| 35 | Logical Volume Descriptor | |
| 36 | Unallocated Space Descriptor | |
| 37 | Terminating Descriptor | |
| 38 to 47 | Trailing Logical Sectors (all 00h bytes) | |
| 48 | Primary Volume Descriptor (UDF) | Reserve Volume Descriptor Sequence |
| 49 | Implementation Use Volume Descriptor | |
| 50 | Partition Descriptor | |
| 51 | Logical Volume Descriptor | |
| 52 | Unallocated Space Descriptor | |
| 53 | Terminating Descriptor | |
| 54 to 63 | Trailing Logical Sectors (all 00h bytes) | |
| 64 | Logical Volume Integrity Descriptor | Logical Volume Integrity Sequence |
| 65 | Terminating Descriptor | |
| 66 to 255 | Reserved (may be used for ISO 9660 path tables and/or directories) | |
| 256 | Anchor Volume Descriptor Pointer | First Anchor Point |
| 257 to p-1 | ISO Path Tables/Directories | ISO 9660 File System |
| p | File Set Descriptor | File Set |
| Last LSN | Anchor Volume Descriptor Pointer | Second Anchor Point |

It is re-emphasized that Table 1 represents only one embodiment of any number of combinations and configurations for the ISO 9660 bridge and volume space contents. Reference is once again drawn to UDF Revision 1.02 for specific content, structure, and organization requirements. In Table 1, "LSN" is the logical sector number, "p" denotes the first block or sector of the partition space, and "p-1" is the block immediately preceding the first block or sector of the partition space.

Returning to FIG. 1B, the volume space 120 includes first anchor 134, also known as the anchor volume descriptor pointer, at block 256. In accordance with UDF Revision 1.02, a first anchor 134 is written to block 256, and a duplicate anchor 150 is written to block "n," the last block or sector of the session. Typically, the anchor 134 is written to block 256 in volume space 120, and identifies the logical sector number of the VDS 130. If a supplementary or redundant VDS is written (see Table 1), the anchor 134 points to the main VDS 134, providing the location and the length of the (main) VDS 130. Generally, by way of example, when a DVD optical media is inserted into a consumer DVD player, the anchor 134 at block 256 is located, pointing the player to the VDS 130, which, as already described, contains structures identifying the start of the partition, the size of the partition, as well as the location and size of the FSD 140.

The FSD 140, in the illustrated embodiment, begins the partition space 122. The partition space 122 is a distinct space within a session or entire media space, and sector numbering restarts. Therefore, in FIG. 1B, the FSD 140 is in the first sector or block of the partition, and numbered "0". Additional sectors or blocks, including user data, are recorded to the partition space 122, and the numbering proceeds consecutively as shown in blocks identified at 142, 144, and 146. The last numbered block or sector, block "n," is the duplicate anchor 150 as described above.

As illustrated in FIG. 1B, a session 100 includes a volume space 120 and a partition space 122. Nothing in UDF Revision 1.02 prohibits the volume space from being within the partition space, but a more typical configuration is as illustrated with the volume space 120 preceding the partition space 122 and having the ISO 9660 bridge, the VDS 130, and the anchor 134 at block 256, among other file structures. The logical sector numbers of the blocks in the volume space 120 begin with block "0" (zero) at the beginning of the session, and running consecutively until the contents of the file system and all other volume space structures are written. The partition space 122 follows the volume space 120, and includes the FSD 140, the root file, file and folder identification structures (file identifiers, also known as "fids"), file entry structures (file entries, also known as FE's), meta-data, user data, and other information. The sector numbering restarts in the partition space 122, thereby identifying each directory, file, folder, structure, and the like by a logical sector number that is relative to the start of the partition.

Figure 2:
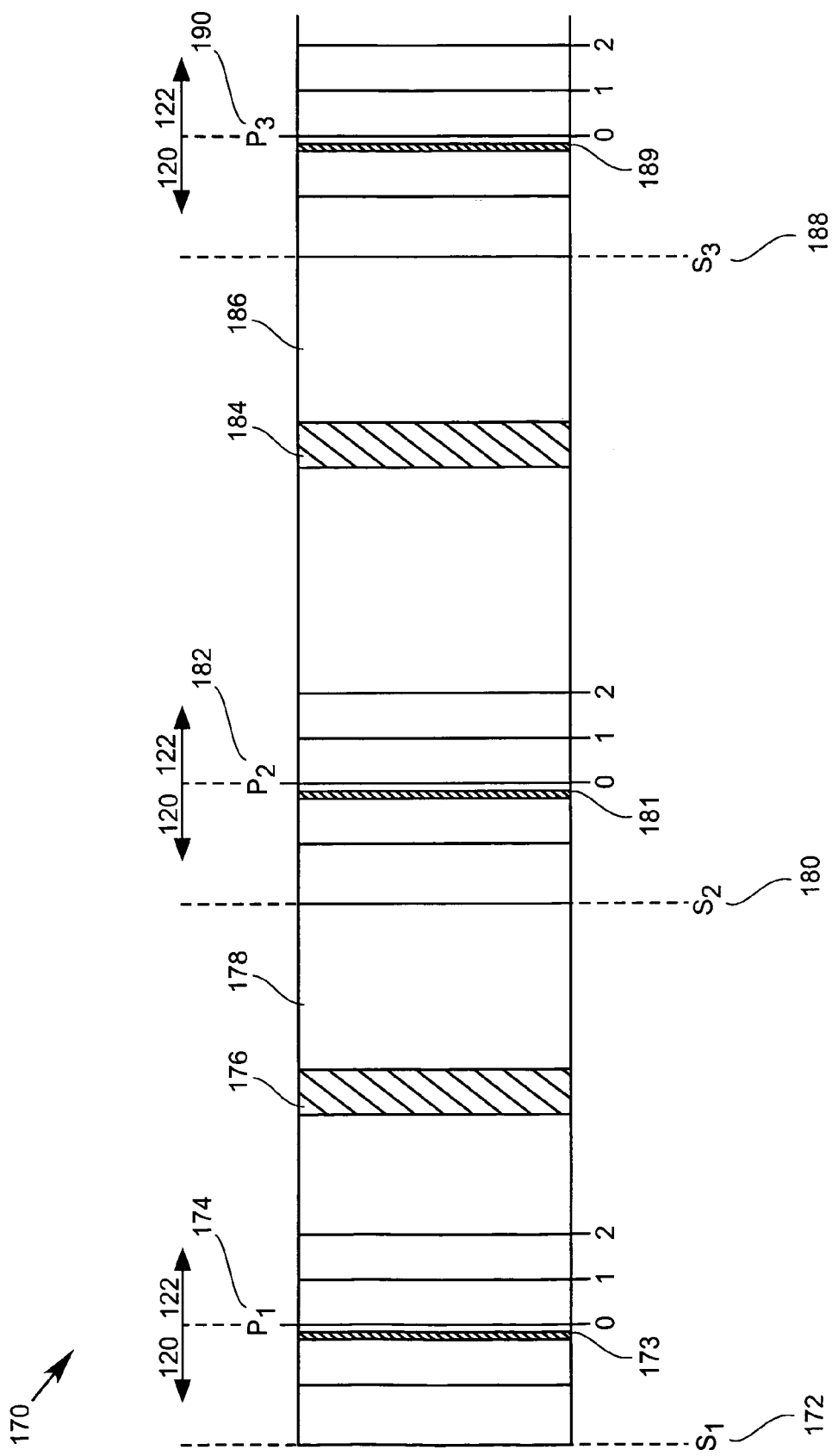
FIG. 2 is a data block diagram of data recorded in multi-session or multi-border to optical media.

FIG. 2 is a data block diagram 170 of data recorded in multi-session or multi-border to optical media. Similar to the single session 100 shown in FIG. 1B, multi-session and multi-border data essentially strings multiple sessions of data together in a single optical media space. In the data block diagram 170 shown in FIG. 2, a first session, $S_1$ at 172, is the first session of data recorded to the optical media space. $S_1$ 172 includes a volume space 120 and a partition space 122. The volume space 120 contains the ISO 9660 bridge, VDS, and other files and structures as described above in reference to FIGS. 1A–1C. A first anchor 173 is written to block 256. The start of the first partition space $P_1$ is shown at 174. As noted, the block or sector numbering re-starts at $P_1$, and continues consecutively until the end of the session. A duplicate anchor is written to a final block or sector of the session, shown at 176, and the session is closed.

A session gap 178 is written between the end of a first session, and the beginning of a next session. The session gap 178 separates the sessions on optical media. In one embodiment, the session gap 178 is of a fixed and constant length whenever it is written. In other embodiments, the session gap is not fixed in length, and is of different sizes in different applications or implementations. In one embodiment, the session gap 178 is of a fixed and constant size of about 18,000 blocks or about 2 Mbytes.

Following the session gap 178, a second session $S_2$ 180 begins. The second session $S_2$ 180 is structurally similar to $S_1$ 172, and includes a volume space 120 and a partition space 122. As with $S_1$ 172, the second session $S_2$ 180 restarts or begins sector numbering in the volume space 120 at the beginning of the session $S_2$ 170, numbering sectors or blocks consecutively through the end of the volume space 120. Sector or block numbering restarts at the beginning of the partition space 122, identified as $P_2$ 182. Sectors or blocks in the volume space 120, therefore, are numbered session-relative, and sectors or blocks in the partition space 122 are numbered partition-relative.

A first anchor 181 is at block 256 in the volume space 120 of the second session $S_2$ 180. As described above, a duplicate anchor 184 is written to the last block of the session $S_2$ 180. The duplicate anchor 184 is in the partition space 122, and terminates the session. A session gap 186 separates the end of session two $S_2$ 180 and the beginning of session three $S_3$ 188.

The third session $S_3$ 188 is structurally similar to the previous two sessions already described. A first anchor 189 is written in the volume space 182, and a duplicate anchor is written to the last block of the session (not shown). The partition space 122 of the third session $S_3$ 188 begins at $P_3$ 190, signifying the third partition space of the optical media. The sector or block numbering of the partition space 122 that starts at $P_3$ 190, begins with 0 (zero), and continues consecutively through the last block or sector in the session 188. The sector or block numbering within the partition space 122 is partition-relative. The sector or block numbering that begins with the first block of the volume space 120, is session-relative and runs consecutively from 0 (zero) through the last block of the volume space 120.

As can be appreciated from FIG. 2, each session $S_1$ 172, $S_2$ 180, and $S_3$ 188 are discrete, and distinct from each other such that the first session, $S_1$ 172 is defined as a specific size or number of blocks or sectors having a determined number of blocks or sectors defining a volume space 120 and consecutively numbered relative to the beginning of the session $S_1$ 172, and a determined number of blocks or sectors defining a partition space 122 and consecutively numbered relative to the beginning of the partition $P_1$ 174. The VDS and other ISO 9660 structures (See FIG. 1B and Table 1) identify an exact size in numbers of blocks or sectors of both the volume space 120 and the partition space 122. Similarly, succeeding sessions $S_2$ 180, $S_3$ 188, and so forth, are each defined with an essentially exact number of sectors or blocks for each volume space 120 and each partition space 122, and each sector is consecutively numbered relative to the respective session for volume space sectors and relative to the respective partition for partition space sectors. Each file, folder, structure, and the like is therefore identifiable within each session relative to the session within which the file folder, structure, and the like is located. Data, therefore, is not located or accessed relative to the optical media space, but relative to the session, and partition within a session.

Optical media, and in particular UDF, typically uses two addressing schemes for sectors or blocks on the media, physical and logical addressing. A physical address of a given block on the media is the address assigned based on the physical construction of the media. In the physical space, every block is visible and has a sequential address. A logical address of a given block on the media is a number assigned to the block by the optical media device, and used by the host system to reference the block. Essentially, all folders, files, structures, and the like in a partition are addressed logically. Logical block numbers or sector numbers are derived relative to a designated point, and in one embodiment of the invention, the designated point is the start of the partition, $P_1$ 174, $P_2$ 182, $P_3$ 190, or relative to a session $S_1$ 172, $S_2$ 180, and $S_3$ 188.

Although data within each session $S_1$ 172, $S_2$ 180, and $S_3$ 188 is referenced to the respective session start and partition start as appropriate, the physical address is known or calculable for essentially every sector of the media space. By way of example, the anchor 181 located in the volume space 120 of the second session $S_2$ 180 is written to block number 256 of the session $S_2$ 180. The essentially exact size of the first session $S_1$ 172 is known. As stated above, the essentially exact size of the session gap 178 is also known. The essentially exact sector of the media space at which the second session $S_2$ 180 starts, the physical address, is therefore known. Since the first anchor 181 in the volume space 120 of the second session $S_2$ 180 is known to be written to block or sector 256, the essentially exact sector or block of the first anchor 181, the physical address, is known. Likewise, the essentially exact block or sector, the physical address, for all data, files, folders, directories, structures, and the like, are known or calculable.

Figure 3:
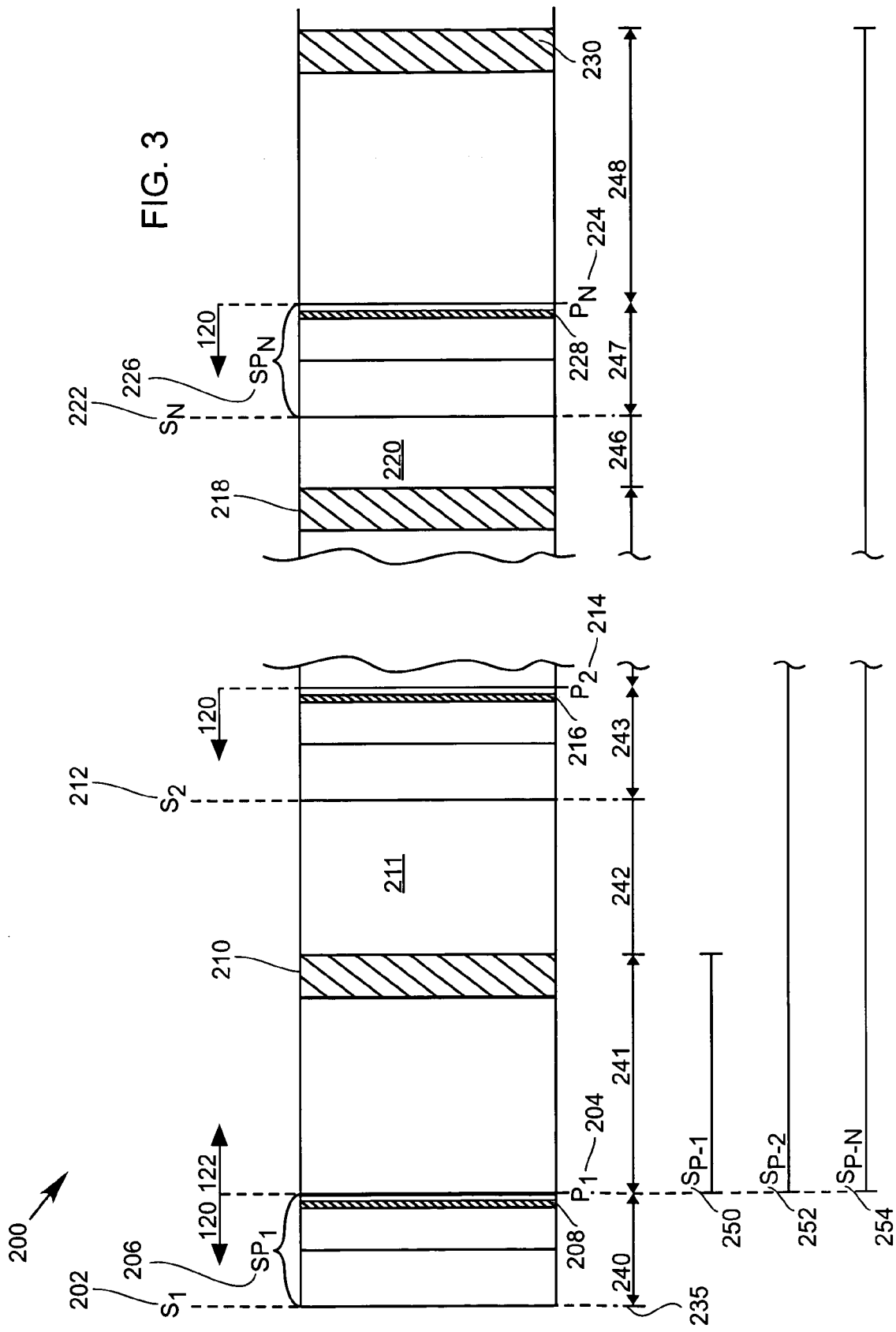
FIG. 3 shows a data block diagram of multiple sessions of data recorded to optical media for a UDF Revision 1.02 environment in accordance with one embodiment of the present invention.

FIG. 3 shows a data block diagram 200 of multiple sessions of data recorded to optical media for a UDF Revision 1.02 environment in accordance with one embodiment of the present invention. The illustrated multiple sessions of data include a first session $S_1$ 202, at least part of a second session $S_2$ 212, and an Nth session $S_N$ 222. A session gap 211 is written between the first session $S_1$ 202 and the second session $S_2$ 212, and a session gap 220 is written immediately preceding the Nth session $S_N$ 222. In one embodiment, the session gap 211, 220 is about 18000 blocks, or approximately 2 Mbytes.

As described above in reference to FIG. 2, the first session $S_1$ 202 includes a volume space 120 and a partition space 122. A first anchor 208 is written to block 256 in volume space 120, and the partition space 122 of the first session $S_1$ 202 begins at $P_1$ 204. A duplicate anchor 210 is written to the last sector of the session $S_1$ 202, the session is closed and immediately followed by first session gap 211. Similar structure and organization is illustrated for the first part of the second session $S_2$ 212, and for the Nth session $S_N$ 222. The volume space 120 for the second session $S_2$ 212 is shown preceding $P_2$ 214, and the volume space 120 for the Nth session is shown preceding $P_N$ 224.

As described above in reference to FIG. 1B, user data is written to the partition space 122 of a session of data. Sectors or blocks of data in a partition space 122, in a typical UDF Revision 1.02 environment, are partition-relative, and are therefore identified by logical addressing and accessed according to the relative position from the start of the partition. Looking again to FIG. 3, all user data in the first session $S_1$ 202 is located in the partition space 122 that begins at $P_1$ 204. The VDS in the volume space 120 of the first session $S_1$ 202 identifies the location and size of $P_1$ 204. In one embodiment of the present invention, the first session $S_1$ 202 is the first and only data recorded to the optical media at the time the first session $S_1$ 202 is recorded. When the duplicate anchor 210 is written to the last sector of the partition space 122 and session $S_1$, the session $S_1$ 202 is closed. The size of the volume space 120 in sectors is known and shown as distance 240 below data block diagram 200 on the total sector continuum 235. In the first session $S_1$ 202, the size of the volume space 120 in sectors or blocks is also the number of sectors or blocks from the beginning of the session $S_1$ 202 to the beginning of the partition $P_1$ 204. This number of sectors is also represented as $SP_1$ 206.

Similarly, the size of the partition space 122 is the number of sectors between $P_1$ and the end of the session $S_1$ 202, which is where the duplicate anchor 210 is written. The total number of sectors in the partition space 122 of the first sector $S_1$ 202 is shown on the total sector continuum 235 as 241. When a single session, e.g., $S_1$ 202, is written to an optical media space, the total partition space 122 in which user data is written is shown as $S_{P-1}$ 250. The absolute number of sectors or blocks written from the beginning of the first session $S_1$ 202 is the sum of distances 240 and 241 on the total sector continuum.

If a second session $S_2$ 212 is written to the optical media following the first session $S_1$ 202, both sessions would not be visible to the typical UDF Revision 1.02 device since each session describes only the space within the session boundaries. Whichever session is opened or accessed, the device only sees the data within the boundaries of that particular session. In accordance with one embodiment of the present invention, second and subsequent sessions are written to the optical media in compliance with the UDF Revision 1.02 specification, and such sessions can provide access to a previously written session or sessions.

When a second session $S_2$ 212 is written to the optical media, a session gap 211 is written immediately following the end of the first session $S_1$ 202 as described above. The size of the gap can be fixed and constant, and the size of the gap can be variable according to application and implementation. In one embodiment, the size of the session gap is a fixed approximately 18000 blocks or approximately 2 Mbytes. In FIG. 3, the size of the session gap in sectors is shown on the total sector continuum 235 at 242.

The second session $S_2$ 212 is then written in essentially the same manner as the first session $S_1$ 202 as described above. The second session $S_2$ 212 includes a volume space 120, and a first anchor 216 is written to block 256 of the volume space 120. The FSD is written to the first sector following the volume space at $P_2$ 214.

As described above in reference to FIG. 2, user data in the partition space 122 is identified and accessed according to logical block or sector that is partition-relative. In typical implementations, each partition space 122 of a session of data restarts the sector or block numbering so that all user data in the session is identified and accessed by logical sector or block referenced to the start of the partition space 122. Looking again to FIG. 3, the partition space 122 for the first session $S_1$ 202 begins at $P_1$ 204, and all user data in the first session $S_1$ 202 is identified and accessed by logical sector or block referenced to the start of that partition space at $P_1$ 204. In accordance with one embodiment of the present invention, the partition space of the second session $S_2$ 212 and every subsequent session $S_N$ 222 is defined to start at the start of the first partition $P_1$ 204 of the first session $S_1$ 202 on the optical media. By way of example, the partition space for the second session $S_2$ 212 is shown defined as $S_{P-2}$ 252 and includes all of the sectors or blocks from $P_1$ 204 through the end (not shown) of the second session $S_2$ 212. For any subsequent session $S_N$ 222 written to the optical media, the partition space is defined to include all of the sectors from $P_1$ 204 in the first session $S_1$ 202 through the end of the session $S_N$ 222, shown at the duplicate anchor 230 written to the last sector of the session $S_N$ 222. The partition space for the subsequent session $S_N$ 222 is shown as $S_{P-N}$ 254.

Subsequent session $S_N$ 222 is used to illustrate the defining of the partition space $S_{P-N}$ that is compliant with the UDF Revision 1.02 in accordance with one embodiment of the present invention, and provides access to the user data in each of the two or more sessions written to the optical media. As described above, the total number of sectors written to the optical media, the physical address for each sector, is known or calculable, thereby allowing the identification of essentially an absolute sector or block number for any sector or block of data on the optical media. The total sector continuum 235 illustrates the total number of sectors written in the exemplary data block diagram 200. From the start of the first session $S_1$ 202, the total number of sectors written to volume space 120 is shown at 240, the total number of sectors written to partition space 122 is shown at 241, and the known session gap 211 is represented at 242. The second session $S_2$ 212 is similar to the first session $S_1$ 202 with the total number of sectors written to the volume space 120 shown at 243, and so forth through the end of session $S_N$ 222, shown at 248. The total sector continuum 235 therefore illustrates that the essentially absolute sector number for the start of each session, e.g., $S_1$ 202, $S_2$ 212, $S_N$ 222, is a known or calculable value, available when writing user data to optical media.

In one embodiment, the second partition and each subsequent partition is defined to start at $P_1$ 204, and continue through the end of the respective session, thereby defining a partition back to a common reference point, and capturing all data written to any sector within the defined partition, e.g., $S_{P-2}$ 252, $S_{P-N}$ 254. As described above, however, a volume space 120, in a typical implementation, is not a fixed or constant size. Generally, a volume space 120 varies in size according to the size of the file system required to describe the user data written to a session. Therefore, volume space 120 in the first session $S_1$ 202 is not necessarily the same size as volume space 120 in the second session $S_2$ 212, or the Nth session $S_N$ 222, and so forth. Each volume space 120, however, has a known or calculable number of sectors as shown in the total sector continuum 235. In one embodiment of the present invention, each partition will be defined to start at the start of the first partition $P_1$ 204. Therefore, the first volume space size $SP_1$ 206 is set as a reference in order to accurately define each partition back to $P_1$. The volume space of each session, e.g., $S_2$ 212, $S_N$ 222, also a known or calculable value, is compared to the reference $SP_1$ 206 to determine a $\Delta SP$, e.g., a change in size of the volume space between the reference volume space ($SP_1$ 206) and a current volume space, to compensate for the differences in size between volume spaces 120.

As described above in reference to FIGS. 1B and 1C, the anchor at block 256 points a device or system to the VDS which points to the location and defines the size of the FSD, and points to the start and defines the size of the partition. In one embodiment of the invention, the FSD is written to the first sector following the volume space 120 in any session, e.g., $S_1$, $S_2$, $S_N$. In the first session $S_1$ 202, the first sector following the volume space $P_1$ is also the first sector of the partition space, and the VDS points to the same sector as the start of the FSD and the partition space 122. In the second and any subsequent sessions $S_2$, $S_N$, the VDS points to the first sector following the volume space $P_2$, $P_N$, as the start of the FSD, but points to $P_1$ as the start of the partition space. The size of the partition space is defined as the total number of sectors from $P_1$ through the end of the respective session.

In FIG. 3, the Nth session $S_N$ 222 is used to illustrate the calculation of the location of the start of the partition space, e.g., $P_1$ 204, for any session written to the optical media subsequent to the first session $S_1$ 202. As described above, the absolute sector number of the start of any session $S_N$ 222 is calculable according to the total sector continuum 235. In one embodiment, each subsequent session $S_N$ 222 starts the sector numbering according to the start of the session, e.g., session $S_N$ 222 starts at sector number 0 (zero). Therefore, in order for the VDS to point to the start of the partition space $P_1$ 204, the total number of sectors from a reference point in the current session, $S_N$ 222, to $P_1$ 204 is calculated. In accordance with one embodiment of the present invention, the reference point is the FSD at $P_N$, and the Equation 1 is used to calculate the start of the partition:

$$S_N - P_1 + \Delta SP \qquad \text{Equation 1}$$

In Equation 1, $S_N$ is the value of the absolute sector number (the physical address) for the start of the current session, $P_1$ is the value of the absolute sector number of the start of the first partition space, and $\Delta SP$ is the difference in size between the current volume space and the reference volume space as described above. In accordance with an embodiment of the present invention, the resulting value defines the start of the partition at the number of blocks or sectors from the reference. Each partition space of any $S_N$ then is defined to include all of the user data from every other session recorded to the optical media.

In one embodiment, the additional file structures to identify the user data (e.g., metadata) from any previous session to the current session are imported into the current session $S_N$ making all of the user data recorded to the optical media in any session visible and accessible. In another embodiment, pointers are written in the current session, $S_N$, pointing to the file structures identifying the user data in each previous session recorded. Similarly, all user data recorded to the optical media in any session is then visible and accessible from the current session $S_N$. In one embodiment, nothing from prior sessions is copied into the current session $S_N$. All the descriptors that are imported are only read, and when the new file system is built, new descriptors reflect the actual file system state including the number of files, file updates, and other file, folder, directory, and structural information, and the like.

Figure 4:
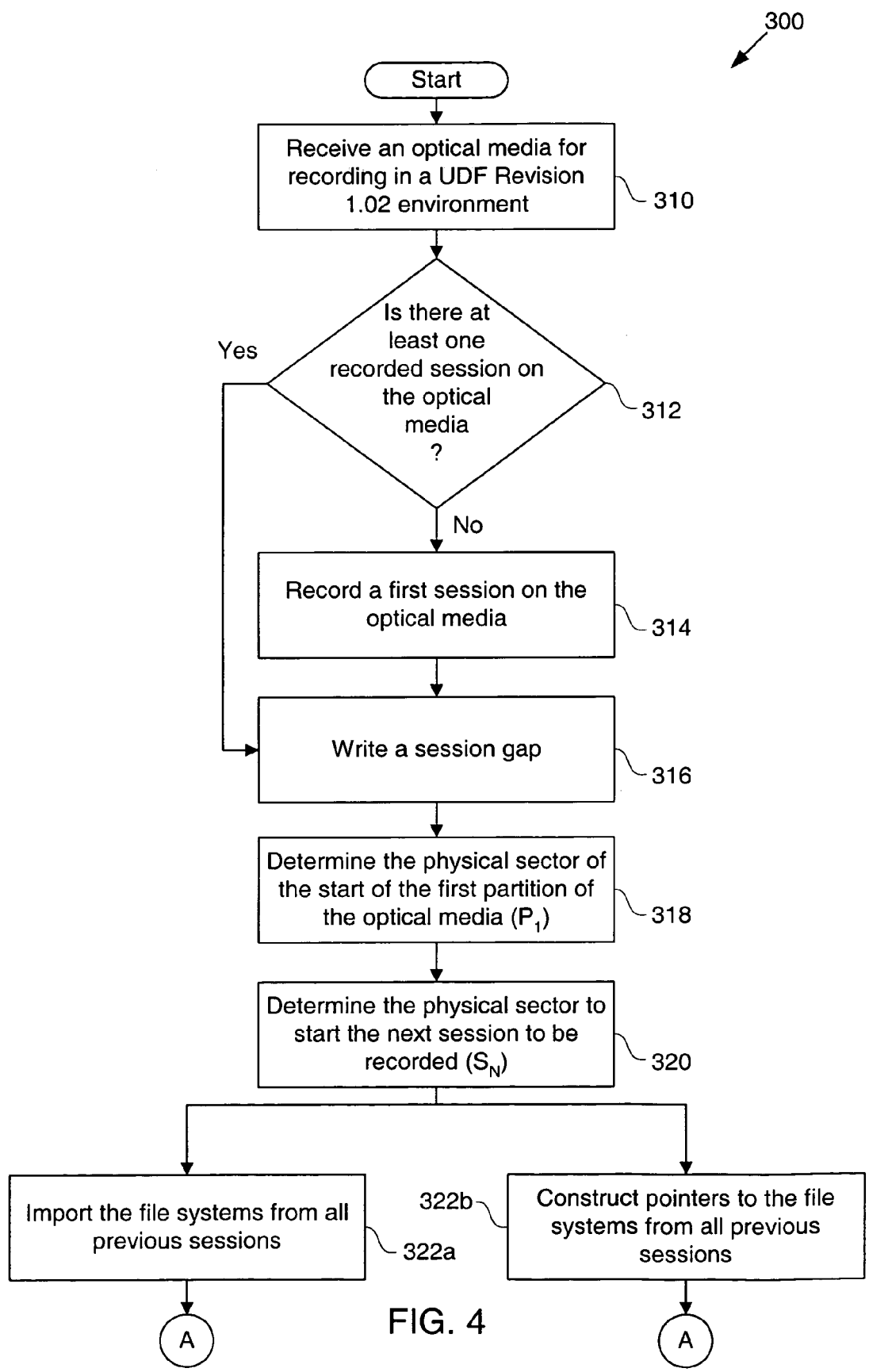
FIG. 4 is a flow chart diagram illustrating the method operations performed to write a multi session optical media that is compliant with UDF Revision 1.02 in accordance with one embodiment of the present invention.

FIG. 4 is a flow chart diagram 300 illustrating the method operations performed to write a multi-session optical media that is compliant with UDF Revision 1.02 in accordance with one embodiment of the present invention. The method begins with operation 310 in which an optical media is received for recording in a UDF Revision 1.02 environment. As used herein, the phrase "recording in a UDF Revision 1.02 environment" is intended to suggest the optical media is recorded in a format compliant with UDF Revision 1.02, and that can be viewed, accessed, identified, and otherwise utilized in a UDF Revision 1.02 device or system.

Once the optical media has been received for recording, the method advances to decision block 312 in which it is determined whether at least one session is already recorded to the optical media. In one embodiment, a recording system or recording software application is multi-session capable in order to make such a determination. If no session is recorded to the received optical media, a "no" to decision block 312, the method advances to method operation 314. If it is determined that at least one session is already recorded to the received optical media, a "yes" to decision block 312, the method skips operation 314 and proceeds with operation 316.

In method operation 314, a first session is recorded to the received optical media. The recording of the first session is according to known methods, practices, and procedures, and is in accordance with the UDF Revision 1.02 specification. Once a first session has been recorded, the method advances to operation 316.

In method operation 316, a session gap is recorded to the optical media immediately following the first session (or last recorded session if more than one session is recorded to the received optical media) on the optical media. In one embodiment of the present invention, a software application used to record a session to optical media in a multi-session recording environment records one of a fixed and a variable sector length session gap. In one embodiment, the session gap is fixed, and in one embodiment, the session gap is approximately 18000 blocks or about 2 Mbytes in length.

After the session gap is recorded in operation 316, the method continues with operation 318 in which the physical sector number of the start of the first partition space on the optical media is determined. The start of the first partition space is designated $P_1$ in FIG. 3 above. As illustrated and described in reference to FIG. 3 above, the absolute sector number for essentially every sector written to the optical media is known or calculable, and the absolute sector number for the start of the first partition P1 is used to define any subsequent partition space on the optical media. In one embodiment of the present invention, the method determines the physical sector number of the start of the first partition space on the optical media in operation 318 as illustrated in FIG. 4, but in other embodiments, the determination is made when the first partition space is defined and the value saved to a file or structure that is accessed in operation 318, and in other embodiments, the file or structure is accessed, or the determination is made at the time of calculation of the start of the next partition (during the writing of a second or subsequent session), or at any other reasonable time according to the recording software application used to record to the optical media in accordance with the present invention.

The method continues with operation 320 in which the physical sector of the start of the next (current) session is determined. In one embodiment of the present invention, prior to writing any data to a session, all writing and processing calculations are accomplished. The absolute value of the first sector of the next (current) session is required to determine the start of the partition space, and in the illustrated embodiment of the invention, the determination of the absolute sector number is made in operation 320. In alternative embodiments, the determination and any associated calculation is accomplished according to the recording software application used to record to the optical media in accordance with the present invention.

Operations 322a and 322b illustrate different embodiments for essentially the same method operation in accordance with the present invention. In operation 322a, file system structures, files, file entries, file identification structures (fids and FE's), and the like are imported from a previously written session or sessions on the optical media. In operation 322b, pointers are identified and constructed to direct the file system of the current session to the files and structures used to identify the user data written in the partition(s) of the previous session(s). Once the file system structures, files, file entries, file identification structures, and the like are imported (operation 322a) or pointers constructed to direct the file system to their location (operation 322b), the method advances through "A" to the continuation of the flow chart diagram 300 in FIG. 5.

Figure 5:
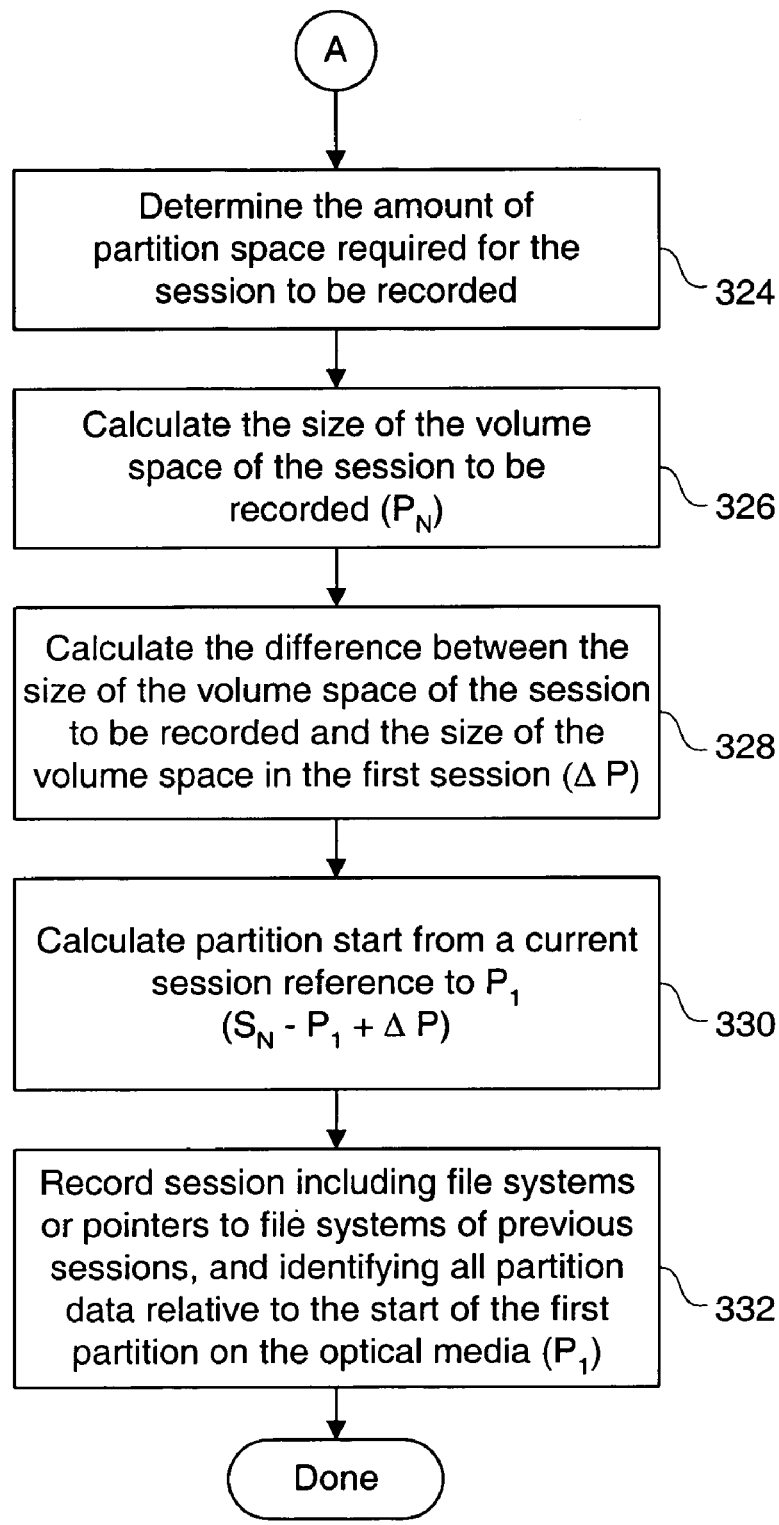
FIG. 5 is the continuation of flow chart diagram showing the method operations performed to write a multi session optical media that is compliant with UDF Revision 1.02 in accordance with one embodiment of the present invention.

FIG. 5 is the continuation of flow chart diagram 300 showing the method operations performed to write a multi-session optical media that is compliant with UDF Revision 1.02 in accordance with one embodiment of the present invention. The method continues through connector "A" to operation 324 in which the amount of partition space required for the session to be recorded is determined. In one embodiment of operation 324, one of a plurality of pre-burn computations are accomplished in order to determine a number of sectors required for the data to recorded in the current session, a destination sector for each sector of data to be recorded, the number of sectors and the destination of the required data structures associated with the user data, and the like. In one embodiment, operation 324 is representative of all such pre-burn calculations.

In operation 326, the size of the volume space for the session to be recorded is calculated. As described in detail above, the volume space includes the file system and data structures to enable playing or viewing of the media in computer systems such as the ISO 9660 bridge, VDS, and the like. The size of the volume space required can vary with the amount of data to be recorded to the session. In one embodiment of the present invention, the size of the volume space is calculated for use in typical pre-burn calculations, and to compare with the volume space of the first session recorded to the optical media.

Next, the method advances to operation 328 in which the difference between the size of the volume space for the session to be recorded and the size of the volume space for the first session recorded to the optical media is calculated. In FIG. 3 above, the resulting value is illustrated and described as $\Delta SP$.

In operation 320, the method calculates the partition start to be defined in the session to be recorded as $P_1$ from the first session on the media. In order to correctly define the partition space, the number of sectors from a reference within the session to be written to $P_1$ from the first session is calculated. In one embodiment of the present invention, the partition start is calculated according to Equation 1, $S_N - P_1 + \Delta SP$. In other embodiments, the current session reference is shifted as desired, and the equation modified accordingly.

Once the pre-burn calculations are complete, and the calculation to define the partition space back to the start of the partition space in the first session $P_1$ as described in operation 330, is accomplished, the method advances to operation 332. In operation 332, the method proceeds to record the session including file systems or pointers to the file system structures, files, file entries, file identification structures, and the like of a previous session or sessions, and identifying all partition data relative to the start of the partition space of the first session recorded to the optical media $P_1$. In accordance with embodiments of the present invention, the session of data is recorded such that it complies with the standards and requirements of UDF Revision 1.02, and the optical media is recorded to be compliant with and visible in a UDF Revision 1.02 device or system. Once the session is recorded, the method is done. Assuming the recordable media is not closed to new data, subsequent sessions may be added, and the method is repeated as desired.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, DVD-ROM, DVD-R/RW, DVD-RAM, DVD+R/+RW, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A software driven method for recording data to optical media, the method comprising:
   receiving an optical media for recording;
   determining if a previous session of data is recorded to the received optical media;
   if a previous session is recorded to the optical media, calculating a media space required for recording a subsequent session to the received optical media;
   locating a sector at which a start of a first partition is defined in a first session on the received optical media;
   locating a first sector for the subsequent session to be recorded to the optical media;
   defining a partition space of the subsequent session to be recorded to the received optical media to begin at the sector at which the start of the first partition is defined in the first session on the received optical media; and
   writing the subsequent session to the optical media with the defined partition space from the sector at which the start of the first partition is defined in the first session through the final sector of the subsequent session.

2. The software driven method for recording data to optical media of claim 1, further comprising:
   writing file system structures to define the partition space of the subsequent session to describe data written to the subsequent session; and
   writing file system structures to define the partition space of the subsequent session to describe data written to the previous session on the received optical media.

3. The software driven method for recording data to optical media of claim 2, wherein the file system structures include file identifiers and file entries.

4. The software driven method for recording data to optical media of claim 2, wherein the writing of the file system structures to define the partition space of the subsequent session to describe data written to the previous session on the received optical media includes reading file system structures written to the previous session on the received optical media.

5. The software driven method for recording data to optical media of claim 2, wherein the subsequent session includes the partition space and a volume space.

6. The software driven method for recording data to optical media of claim 2, wherein user data written to the subsequent session is referenced to the sector at which the start of the first partition is defined in the first session.

7. The software driven method for recording data to optical media of claim 2, wherein the writing of the subsequent session to the optical media creates a multi-session optical media, the multi-session optical media being compliant with UDF 1.02.

8. The software driven method for recording data to optical media of claim 7, wherein the optical media is a DVD.

9. A method for writing a multi-session optical media, comprising:
   receiving an optical media to which user data is to be written, the optical media having at least one session of data recorded thereto;
   determining a total size of media space required to write selected user data to a next session on the optical media;
   determining a sector at which the selected user data will start in the next session;
   calculating a number of sectors between the sector at which the selected user data will start in the next session and a sector at which user data begins in a first session on the optical media; and
   writing the selected user data to the next session on the optical media,
   wherein the selected user data is addressed on the optical media in reference to the sector at which user data begins in the first session on the optical media.

10. The method of claim 9, wherein the next session on the optical media includes a partition space and a volume space.

11. The method of claim 10, wherein the determining the sector at which the selected user data will start in the next session includes determining a size of the volume space required to write the selected user data to the next session on the optical media.

12. The method of claim 11, further comprising:
    writing file system structures to the next session on the optical media in the volume space, the file system structures describing the selected user data;
    importing first session file system structures, the first session file system structures being located in a first session volume space and describing user data in the first session on the optical media; and
    writing additional file system structures to the next session on the optical media in the volume space, the additional file system structures describing user data in the first session on the optical media.

13. The method of claim 12, wherein user data in the first session on the optical media and the selected user data are accessible from the next session on the optical media.

14. The method of claim 12, wherein the multi-session optical media is compliant with UDF 1.02.

15. Computer readable media having program instructions for recording data to optical media, the computer readable media comprising:
    program instructions for accessing a previous session of data recorded to the optical media;
    program instructions for calculating a media space required for recording a next session to the optical media;
    program instructions for locating a sector at which a start of a first partition is defined in a first session on the optical media;
    program instructions for determining a physical address for a first sector for the next session to be recorded to the optical media;
    program instructions for defining a partition space of the next session to be addressed from a point of reference defined at the sector at which the start of the first partition is defined in the first session on the optical media; and
    program instructions for writing the next session to the optical media.

16. The computer readable media having program instructions for recording data to optical media of claim 15, further comprising:
    program instructions for writing file system structures to a volume space of the next session, the file system structures describing user data;

program instructions for importing first session file system structures, the first session file system structures being located in a first session volume space and describing user data in the first session on the optical media; and program instructions for writing additional file system structures to the volume space of the next session, the additional file system structures describing user data in the first session on the optical media.

17. The computer readable media having program instructions for recording data to optical media of claim 16, wherein the user data in the first session on the optical media and the user data in the next session are accessible from the next session on the optical media.

18. The computer readable media having program instructions for recording data to optical media of claim 16, wherein the optical media is compliant with UDF 1.02.

* * * * *